United States Patent
Toyooka et al.

(10) Patent No.: US 9,044,714 B2
(45) Date of Patent: Jun. 2, 2015

(54) MEMBRANE MODULE, MEMBRANE UNIT, AND MEMBRANE SEPARATION DEVICE

(75) Inventors: Kazuhiro Toyooka, Yokohama (JP); Shigeo Sato, Kiyose (JP)

(73) Assignee: MEIDENSHA CORPORATION, Tokyo (JP)

( * ) Notice: Subject to any disclaimer, the term of this patent is extended or adjusted under 35 U.S.C. 154(b) by 415 days.

(21) Appl. No.: 13/502,612

(22) PCT Filed: Oct. 25, 2010

(86) PCT No.: PCT/JP2010/068818
§ 371 (c)(1),
(2), (4) Date: Apr. 18, 2012

(87) PCT Pub. No.: WO2011/052525
PCT Pub. Date: May 5, 2011

(65) Prior Publication Data
US 2012/0223005 A1 Sep. 6, 2012

(30) Foreign Application Priority Data
Oct. 26, 2009 (JP) .................................. 2009-245070

(51) Int. Cl.
*B01D 63/08* (2006.01)
*B01D 65/02* (2006.01)
(Continued)

(52) U.S. Cl.
CPC .............. *B01D 63/082* (2013.01); *B01D 63/08* (2013.01); *B01D 2313/08* (2013.01); *B01D 65/02* (2013.01); *B01D 2315/06* (2013.01); *B01D 2321/185* (2013.01); *C02F 1/006* (2013.01);
(Continued)

(58) Field of Classification Search
CPC ............ B01D 2315/06; B01D 63/082; B01D 2321/185; B01D 61/18; B01D 2313/08; B01D 25/02; B01D 63/08; C02F 3/1273; C02F 1/444; C02F 2303/20; C02F 1/006
See application file for complete search history.

(56) References Cited

U.S. PATENT DOCUMENTS
2009/0236295 A1  9/2009  Braun et al.

FOREIGN PATENT DOCUMENTS
GB   2 332 380 A   6/1999
JP   4-74526 U    6/1992
(Continued)

OTHER PUBLICATIONS
European Extended Search Report, Jun. 16, 2014, 6 pages.
(Continued)

*Primary Examiner* — John Kim
(74) *Attorney, Agent, or Firm* — Foley & Lardner LLP

(57) ABSTRACT

A membrane separation apparatus in which a membrane clogging is moderated to lower a load to filtering. A plurality of separation membranes 4 are stored vertical and parallel to each other inside the a casing 6 formed with opening sections which respectively open in upper and lower directions thereby configuring a membrane module 3. In a flow passage through which treated water for the membrane module 3 flows, a water flow guide 5 is provided such that an opening area $S_2$ of the flow passage through which treated water outflows is smaller than an opening area $S_1$ of the flow passage through which treated water inflows. Additionally, a plurality of the membrane modules 3 are stacked one upon another in a direction of height of a casing thereby to configure a membrane unit 2. An air diffusing device 7 is disposed below this membrane unit 2 thereby configure a membrane separation apparatus 1.

8 Claims, 5 Drawing Sheets

(51) Int. Cl.
*C02F 1/00* (2006.01)
*C02F 1/44* (2006.01)
*C02F 3/12* (2006.01)
*B01D 61/18* (2006.01)

(52) U.S. Cl.
CPC ............... *C02F 1/444* (2013.01); *C02F 3/1273* (2013.01); *C02F 2303/20* (2013.01); *B01D 61/18* (2013.01)

(56) References Cited

FOREIGN PATENT DOCUMENTS

| | | | |
|---|---|---|---|
| JP | 9-215980 A | 8/1997 | |
| JP | 2000-84553 A | 3/2000 | |
| JP | 2001-29952 A | 2/2001 | |
| JP | 2003-71257 A | 3/2003 | |
| JP | 2007-152282 A | 6/2007 | |
| JP | 2008-284422 A | 11/2008 | |
| JP | 2009-154101 A | 7/2009 | |
| WO | WO 02/45827 A1 | 6/2002 | |
| WO | WO 2007/128565 A2 | 11/2007 | |

OTHER PUBLICATIONS

Taichi Uesaka et al., Kubota Submerged Membrane Unit Applied for Upgrading of Wastewater Treatment and Water Re-use, Kubota Technical Report, Jun. 2005, pp. 42-50.

MEMBRANE MODULE, MEMBRANE UNIT, AND MEMBRANE SEPARATION DEVICE

TECHNICAL FIELD

This invention relates to a membrane module, a membrane unit formed by stacking the membrane modules one upon another, and a separation apparatus provided with the membrane module or the membrane unit, and particularly to the membrane module, the membrane unit and the membrane separation apparatus to be used in the field of water treatment.

BACKGROUND ART

A membrane separation technique has been hitherto used for seawater desalination, water purification treatment, gas separation, hemocatharsis and the like, in which researches have been recently advanced to apply the membrane separation technique to waste water treatment from the viewpoint of environmental protection.

Hitherto, sand filtration, gravity sedimentation and the like have been carried out as processes for accomplishing solid-liquid separation of treated water high in turbidity, such as water purification treatment, sewage, waste water treatment, treatment of industrial waste and water and the like. However, the solid-liquid separation by these processes have problems such as occurrence of a case where the water quality of obtained treated water becomes insufficient or of requiring a vast site for the solid-liquid separation.

As processes for solving these problems, a variety of studies have been made in recent years on a process for accomplishing the solid-liquid separation of treated water by using a membrane module provided with a separation membrane such as a precision filtration membrane, an ultrafiltration membrane or the like. With these processes, the filtration treatment for treated water is carried out by using a separation membrane, and therefore treated water high in water quality can be obtained (see, for example, Non-patent Citation 1).

In case of accomplishing the solid-liquid separation of treated water by using a separation membrane, clogging at a separation membrane surface with suspended matter proceeds with continuation of filtration treatment, thereby resulting in lowering in filtration flow amount or rising of a differential pressure across the membrane. In order to restore such a condition, a diffuser pipe is disposed below the membrane module to accomplish a process for peeling off the suspended matter at the separation membrane surface by swingingly move the treated water at the membrane surface under the action of air diffused from this diffuser pipe. (see, for example, Patent Citations 1 and 2).

PRIOR ART CITATION

Patent Citation

Patent Citation 1: Japanese Patent Provisional Publication No. 2000-84553
Patent Citation 2: Japanese Patent Provisional Publication No. 2007-152282

Non-Patent Citation

Non-patent Citation 1: Taichi Kamisaka and 3 others, "Kubota Submerged Membrane Unit Applied for Upgrading of Wastewater Treatment and Water Re-use", Kubota technical report, Kubota Corporation, June 2005, Volume 39, pages 42-50.

DISCLOSURE OF THE INVENTION

Problems to be Solved by the Invention

However, with the mode of accomplishing filtration by using a membrane module, there arises a case where a filtration flow amount is lowered under clogging of a membrane surface with suspended matter in case that an operation continues for a long time, and therefore frequent maintenance operations are required in order to restore the lowered filtration flow amount.

Particularly in a membrane separation apparatus in which membrane modules are stacked in a height direction and a diffuser pipe is disposed below a membrane module aggregate, a flow path of the membrane separation apparatus is simply blocked from outside treated water so that the treated water is filtered by the separation membrane, and therefore an activated sludge concentration of the treated water flowing the inside of the membrane separation apparatus rises as a location becomes upper in the membrane separation device. Accordingly, a load to filtration increases thereby arising fears of accelerating a membrane clogging and an increase in consumed energy.

The present invention has been made to solve the above problems and has an object to provide a membrane module which is low in degree of clogging of a membrane surface with suspended matter while moderating an increase of load in filtration for a long time, a membrane unit which is configured by stacking the membrane modules one upon another, and a membrane separation apparatus provided with the membrane module or the membrane unit.

Means for Solving Problems

A membrane module according to the present invention for attaining the above-mentioned object is characterized by comprising a casing, and a plurality of membrane elements stored inside the casing, wherein an opening area of a flow passage of the casing through which treated water outflows is smaller than an opening area of a flow passage of the casing through which treated water inflows.

Additionally, the membrane module according to the present invention is, in the above-mentioned membrane module, characterized in that a flow stabilizing member is disposed at a lower end section of the membrane element to introduce treated water into a space between the membrane elements.

Additionally, a membrane unit according to the present invention for attaining the above-mentioned object is characterized by comprising a plurality of membrane modules each of which includes a casing formed with opening sections which are respectively opened in upward and downward directions, the membrane modules being stacked one upon another in a direction of height of the casing, and a plurality of membrane elements stored inside each casing, wherein each membrane module is configured such that an opening area of a flow passage of the casing through which treated water outflows is smaller than an opening area of a flow passage of the casing through which treated water inflows.

Additionally, a membrane separation apparatus according to the present invention for attaining the above-mentioned object is characterized by comprising a plurality of membrane modules each of which includes a casing formed with opening sections which are respectively located at an upper side and a lower side, a plurality of membrane elements stored inside each casing, and an air diffusing device disposed below the membrane modules.

Additionally, a membrane separation apparatus according to the present invention for attaining the above-mentioned object is characterized in that the membrane modules are stacked one upon another in a direction of height of the casing to configure a membrane unit.

Effects of the Invention

According to the above invention, a membrane clogging is moderated while reducing a load in filtration, in a membrane module, a membrane unit and a membrane separation apparatus.

MODE FOR CARRYING OUT THE INVENTION

A membrane module, a membrane unit and a membrane separation apparatus according to an embodiment of the present invention will be discussed in detail with reference to FIGS. 1 to 3.

In this embodiment, the membrane separation apparatus of a system using a diaphragm separation activated sludge process (Membrane Bioreactor: MBR) in a sewage and waste water treatment facility is exemplified; however, the membrane module and the membrane separation apparatus according to the present invention are not limited to this embodiment and therefore applicable to filtration of a variety of treated waters which are to be treated (treated waters which are not limited to water and therefore may be organic solvent or the like).

Figure 1:
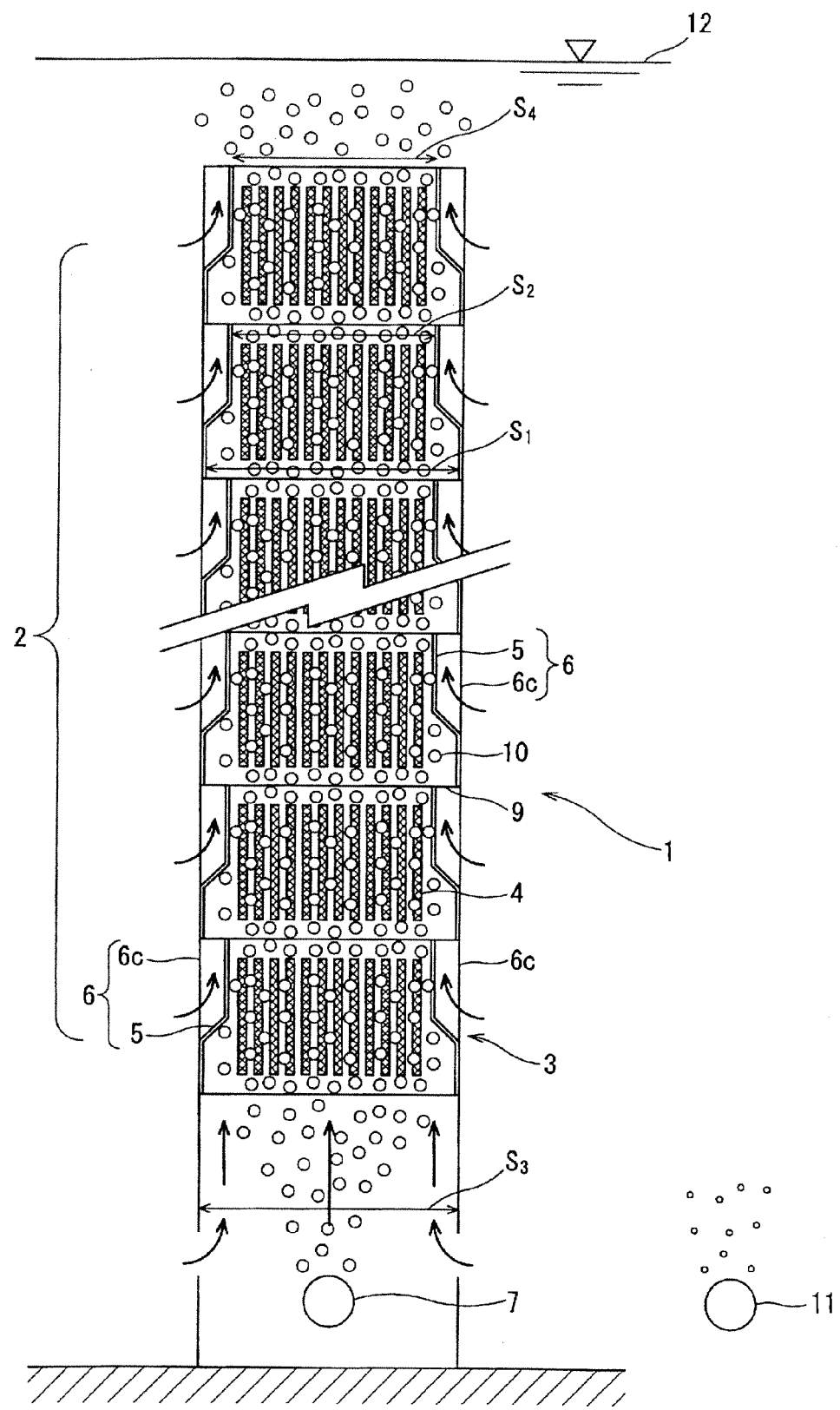
[FIG. 1] is a schematic sectional view showing an example of a membrane separation apparatus according to an embodiment of the present invention.

As shown in FIG. 1, the membrane separation apparatus 1 according to the embodiment of the present invention includes the membrane unit 2 which is configured by stacking a plurality of membrane modules 3 one upon another in a direction of height of a casing 6, and an air diffusing device 7 disposed below the membrane unit 2 to diffuse gas.

This membrane separation apparatus 1 is installed to be dipped in a liquid phase 12 inside a bioreactor bath of MBR. The water depth of the bioreactor bath is generally about 4 m in many cases, so that the number of the membrane modules 3 to be stacked is selected in view of the water depth and the weight and outer shape of the bioreactor bath upon taking account of maintainability. For example, the number of the membrane modules 3 is selected such that the height of the membrane separation device 1 becomes about 2 m to 3 m.

Figure 3:
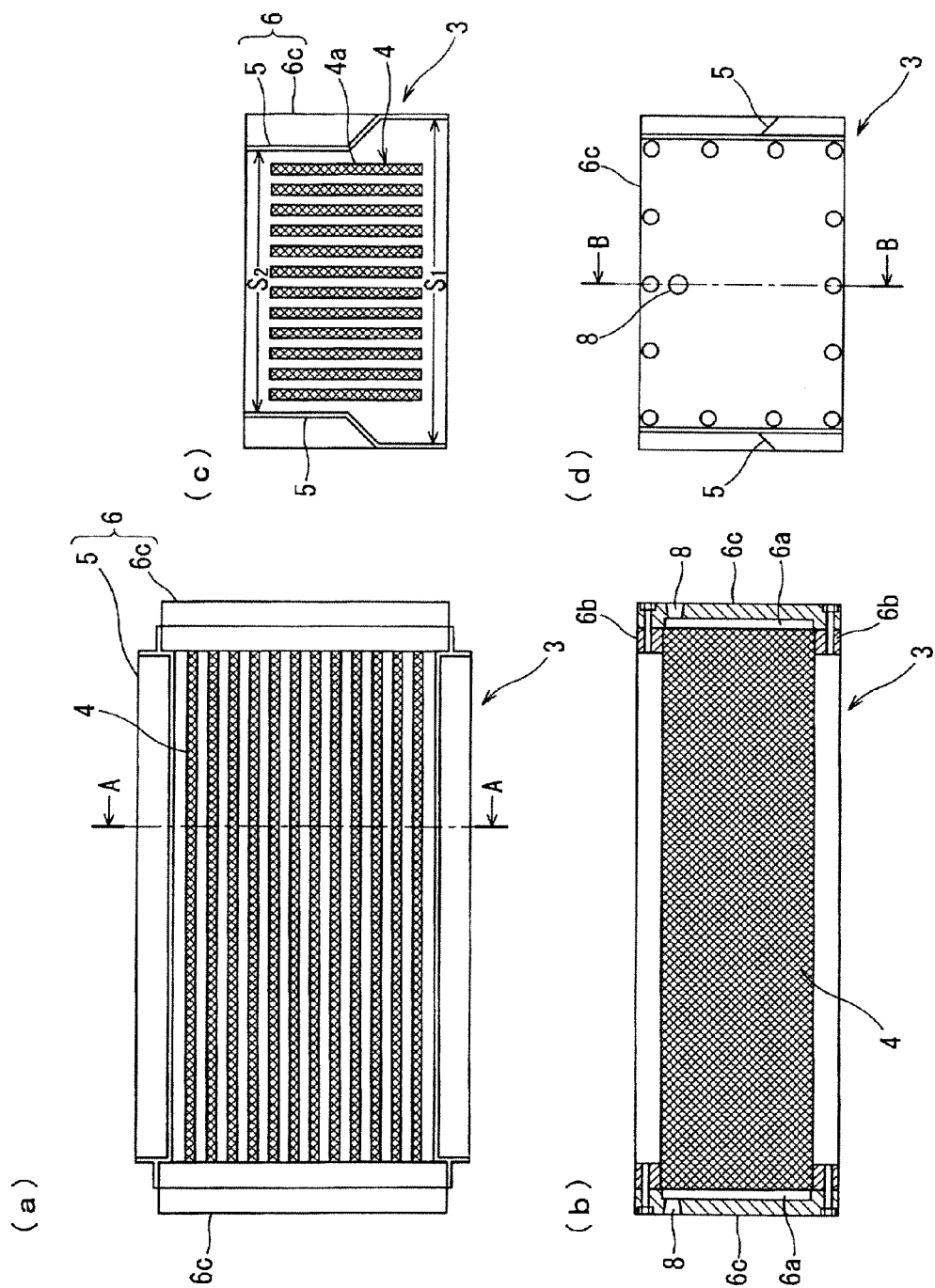
[FIG. 3] is a schematic view showing an example of a membrane module according to the embodiment of the present invention, in which (a) is a top plan view, (b) is a sectional view taken along a plane parallel with the separation membrane (a sectional view taken along the line B-B), (c) is a sectional view taken along a plane perpendicular to the separation membrane (a sectional view taken along the line A-A), and (d) is a side view taken along a plane perpendicular to the separation membrane.

For example, as shown at (a) in FIG. 3, the membrane module 3 includes a plurality of planar separation membranes 4, water collection blocks 6c for supporting the side end sections of the separation membranes 4, and water flow guides 5 for blocking the side surfaces of the water collection blocks 6c. In other words, the casing 6 formed with opening sections at its upper and lower sides is constituted by the water collection blocks 6c and the water flow guides 5. With such a configuration, the separation membranes 4 are disposed inside the casing 6 in such a manner that the membrane surface of each separation membrane 4 is parallel with a direction in which treated water passing through the membrane module 3 flows.

The air diffusing device 7 is disposed below the membrane module 3 to generate air bubbles to wash (or scrub) the separation membranes 4 disposed in the membrane module 3. The air diffusing device 7 is particularly not limited so that one including a cylindrical member formed of metal or plastic and formed with holes each having a diameter of about 1 to 10 mm is exemplified. An air inflowing pipe through which scrubbing air supplied from a blower or a compressor (not shown) flows is connected to one end of this cylindrical member so that scrubbing air inflowing through the air flowing pipe is ejected from the holes thereby generating air bubbles 10.

First, the separation membrane 4 according to the embodiment of the present invention will be discussed in more detail with reference to (a) and (b) in FIG. 2.

Figure 2:
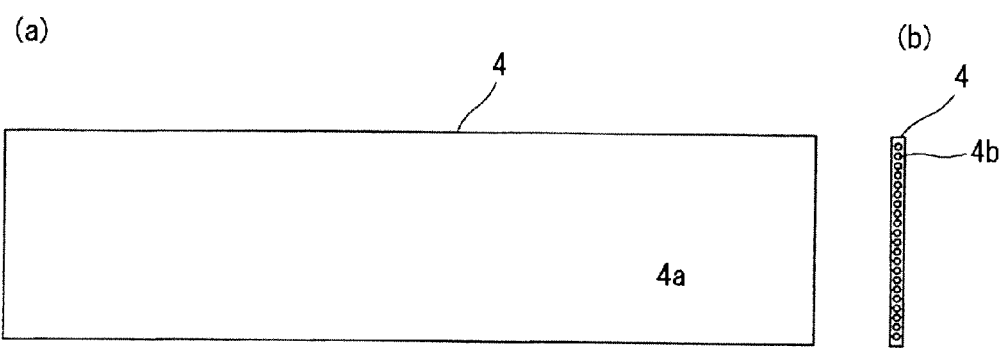
[FIG. 2] is a view showing an example of a separation membrane according to the embodiment of the present invention, in which (a) is a lengthwise side view, and (b) is a breadth wise side view.

The separation membrane 4 exemplified at (a) and (b) in FIG. 2 is a ceramic flat membrane of a flat plate type, having a width of 100 to 200 mm, a length of 200 to 1000 mm and a thickness of 5 to 20 mm. As shown at (b) in FIG. 2, this ceramic flat membrane is formed at its end section with a plurality of water collection passages 4b. In general, the ceramic flat membrane is preferably produced by extrusion molding. In case of the extrusion molding, a suitable size of the ceramic planar plate may be decided taking account of producing machinery such as a metallic mold and the like and deformation and the like after extrusion of the ceramic flat membrane Kinds of the separation membrane 4 to be used may be, for example, known separation membranes applied to MBR, such as organic hollow fiber membrane, organic flat membrane, inorganic flat membrane, inorganic single-tube membrane and the like. Examples of the material of the separation membrane 4 include cellulose, polyolefin, polysulfone, PVDF (polyvinylidene fluoride), PTFE (polytetrafluoroethylene), ceramic and the like.

Additionally, the pore size of the separation membrane 4 is also not limited and therefore may be selected according to the particle diameters of substances as objects of the solid-liquid separation. For example, the pore size may be not larger than 0.5 μm if the separation membrane is used for the solid-liquid separation of activated sludge. Additionally, the pore size may not larger than 0.1 μm in case that bacteria removal is required like filtration of purified water. In other words, the pore size may be a size (0.001 to 0.1 μm) of pores which are generally formed in a ultrafiltration membrane or a size (0.1 to 1 μm) of pores which are generally formed in a precision filtration membrane.

As discussed above, the kinds of the separation membrane 4 are not limited to the embodiment and therefore are decided upon totally taking account of compactability of the membrane module 3, reduction in pressure drop during taking-out of filtrate, easiness of processing during disposing the membrane module 3, and the like. Additionally, the disposition mode of the separation membrane may be also suitably set according to the shape and kind of the separation membrane 4.

Next, the membrane module according to the embodiment will be discussed in more detail exemplifying (a) and (b) in FIG. 3.

As shown at (a) in FIG. 3, the membrane module 3 is configured such that the opposite side end sections of the separation membrane 4 are respectively supported by two water collection blocks 6c, and the opposite side surfaces of the water collection block 6c are respectively blocked with the two water flow guides 5. Thus, a plurality of separation membranes 4 are disposed vertical and parallel with each other within the casing 6 formed by the water collection blocks 6c and the water guides 5. Examples of the shape of the casing 6 are, for example, a cylinder having a circular cross-section, a cylinder having a rectangular cross-section, and the like. In case of the shape of the cylinder having a rectangular cross-section, the cylinder may be constituted of a plurality of planar plates (or corrugated plates) like the embodiment. Additionally, the material of the casing 6 may be plastic, metal, ceramic or the like and therefore be not particularly limited. Further, the number of the separation membranes provided inside the casing 6 may be suitably selected taking account of operationality and maintainability, so that the number may be, for example, around 10 to 30.

As shown at (b) in FIG. 3, the water collection block 6c is provided with a separation membrane fixing section 6b so as to fix the separation membrane 4 to the separation membrane fixing section 6b, so that a water collection section 6a is formed by the separation membrane 4 and the water collection block 6c. The water collection section 6c is in communication with the water collection passage 4b of the separation membrane 4 as shown at (b) in FIG. 2. Additionally, as shown at (b) and (d) in FIG. 3, the water collection section 6a is in communication with a filtration suction opening 8 formed in the water collection block 6c. Furthermore, the piping of a pump (not shown) for sucking filtered liquid is connected to this filtration suction opening 8. It is to be noted that the water collection section 6a may be provided to at least one end section of the separation membrane 4.

Additionally, as shown at (c) in FIG. 3, a water flow guide 5 is formed in such a manner that the flow passage width of an opening section through which treated water from the membrane module 3 outflows is smaller than the flow passage width of an opening section through which treated water inflows. As shown at (b) in FIG. 3, the flow passage width formed by the water collection block 6c is constant; however, by virtue of the thus formed water flow guide 5, the flow passage width of the membrane module 3 is decreased so that the opening area (indicated by $S_2$ in FIG. 1) of an upper opening of the membrane module 3 is formed smaller than the opening area (indicated by $S_1$ in FIG. 1) of a lower opening. In other words, by virtue of the water flow guide 5, the opening area $S_1$ (the opening area of the lower opening of the membrane module 3) of the flow passage through which treated water inflows is larger than the opening $S_2$ (the opening area of the upper opening of the membrane module 3) of the flow passage through which treated water outflows, in the flow passage through which treated water passes through the inside of the membrane module 3. It is to be noted that the opening areas of the upper and lower ends of the flow passage of the membrane module 3 are different; however, the width between the water collection blocks 6c is constant, and therefore the membrane modules 3 can be stacked one upon another.

The shape of the water flow guide 5 is not limited to one shown at (C) in FIG. 3, so that it is sufficient that the opening area $S_1$ of the flow passage through which treated water inflows is formed larger than the opening area $S_2$ of the flow passage through which treated water outflows, in the flow passage of treated water at the upper opening end of the membrane module 3. Additionally, if the water flow guides 5 are disposed opposite to each other, conditions (concentrations and flow rates of treated water) of the treated water flowing near all separation membranes 4 can be made the generally same. In this case, the two water flow guides 5 having the same height as that of the membrane module 3 may be disposed opposite to each other and respectively located at left and right sides of the membrane element groups as shown in FIG. 1; however, a plurality of water flow guides 5 each of which is formed by being divided in a height direction of the membrane module 3 may be disposed in the height direction of the membrane module.

Operation of the membrane module 3 having the above-discussed configuration will be discussed. Treated water flowing inside the membrane module 3 is brought into contact with the separation membrane 4, and solid matter and the like in treated water gets caught at the membrane surface 4a of the separation membrane 4 so that treated water is separated into water content and the solid matter and the like. Filtrated water obtained by thus removing the solid matter and the like reaches the water collection passages 4b and transferred through the water collection sections 6a and the filtration suction opening 8 connected to the water collections passages 4b, to the outside of the bioreactor bath (the outside of the membrane separation apparatus 1).

As discussed above, in the membrane module 3 according to the embodiment of the present invention, the shape of the water flow guide 5 is formed in such a manner that the flow passage of a section provided with the separation membranes 4 of the membrane module 3 is formed narrow, and therefore the flow rate of treated water flowing through a space between the water flow guide 5 and the separation membrane 4 and a space between the separation membranes 4 is increased thereby improving a washing effect. Additionally, by narrowing the flow passage, a gas-liquid mixture flow containing air bubbles 10 converges thereby making it possible that air bubbles effectively act on the membrane surface 4a of the separation membrane 4. Further, by disposing the water flow guide 5 in such a manner that the surface of the water flow guide 5 is parallel with the membrane surface 4a of the separation membrane 4 and by decreasing the distance between the surface of the water flow guide 5 and the membrane surface 4a of the separation membrane 4 opposite to the surface of the water flow guide, air bubbles can be allowed to more effectively act on the membrane surface 4a of the separation membrane 4.

Additionally, as shown in FIG. 1, treated water existing in the outer peripheral section of the membrane unit 2 inflows into the membrane unit 2 through a clearance 9 which is formed between the end of the upper opening of the membrane module 3 and the end of the lower opening of the membrane module when the membrane unit 2 is configured by stacking the membrane modules 3 one upon another. Accordingly, an increase in concentration of treated water flowing though the inside of the membrane unit 2 can be lowered, thereby improving a filtration efficiency with the separation membrane 4. Particularly, the surface of the opening of the clearance 9 is formed perpendicular to a flowing direction of treated water flowing through the membrane unit 2, and therefore air bubbles 10 flowing near the wall surface of the water flow guide 5 can be prevented from being released to the outside of the membrane unit 2 (and the membrane separation apparatus 1).

Figure 4:
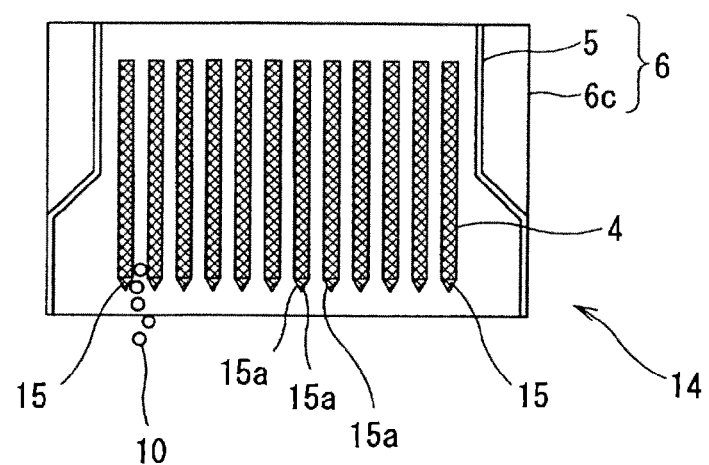
[FIG. 4] is a view showing a membrane module according to another embodiment of the present invention.

FIG. 4 is a figure showing the membrane module 14 according to another embodiment of the present invention. The membrane module 14 according to another embodiment of the present invention is characterized by being provided with a flow stabilizing member 15 at the lower end section of the separation membrane 4 in addition to the configuration of the membrane module 3 according to the embodiment of the present invention. Accordingly, the same reference numerals are assigned to the same members as in the configuration of the membrane module 3 according to the embodiment of the present invention, thereby omitting the detailed explanation thereof.

As shown in FIG. 4, the flow stabilizing member 15 of the shape of a reversed triangle in vertical section is provided to the lower end section of the separation membrane 4. This flow stabilizing member 15 has a length in a direction perpendicular to the surface of FIG. 4, set equivalent to that of the separation membrane 4, and is installed in such a manner that the opposite end sections of the flow stabilizing member 15 are respectively fitted in grooves formed in the water collection block 6c for supporting the separation membranes 4. In other words, the flow stabilizing member 15 is of the shape of a triangular prism, and the shape of at least one side surface of the flow stabilizing member 15 is generally the same as that of the surface of the lower end section of the separation membrane 4.

The flow stabilizing member 15 is disposed at the lower end section of each separation membrane 4, and therefore the inlet of the flow passage of treated water between the separation membranes 4 is formed in such a shape as to spread in a direction toward the lower side. In other words, the distance between opposite inclined surfaces 15a of the opposite flow stabilizing members 15 gradually decreases in a direction toward the upper side, so that a sudden decrease in flow passage area between the separation membranes 4 can be moderated. Accordingly, the gas-liquid mixture flow rising from the air diffusing device 7 inflows to the flow passage between the separation membranes 4 while being guided along the opposite inclined surfaces 15a of the opposite flow stabilizing members 15. By this, the gas-liquid mixture flow is restrained from its suddenly contraction in the flow passage between the separation membranes 4. As a result, large air bubbles containing in the gas-liquid mixture flow pass through the space between the separation membranes 4 without being decomposed to small air bubbles. Additionally, the gas-liquid mixture flow rising from the air diffusing device 7 can be introduced into between the separation membranes 4 without being stayed at the lower end surface of the separation membrane 4 under the action of the flow stabilizing member 15.

It is to be noted that the flow stabilizing member 15 is sufficient to be one which makes the above-discussed effects, and therefore it may be a member which is generally triangular in vertical section without being limited to the above-discussed embodiment. Additionally, the separation membrane 4 may be formed during formation thereof, in such a manner that the shape of the lower end section of the separation membrane 4 becomes similar to that of the flow stabilizing member 15.

Detailed discussion will be made on operation of the membrane separation apparatus according to the embodiment of the present invention with reference to FIG. 1. In MBR, the air diffusing device 7 is disposed below the separation membrane in order to prevent the separation membrane 4 from clogging due to adherence and accumulation of fine foreign substances, extracellular polymers produced by micro-organisms, and the like on and in the separation membrane 4. Air diffusion from the air diffusing device 7 may be carried out always continuously at least in a process of filtering being made. An immersion suction filtration process or a gravitation filtration process under a water head difference are used as an operation method for the membrane separation apparatus 1.

In case of carrying out filtration, air is diffused from the air diffusing device 7 and a gas diffusing device 11 for supplying oxygen, provided in a liquid bath 12 of the bioreactor bath to supply oxygen necessary for reaction of micro-organisms into the liquid phase. By diffusing air from the air diffusing device 7, rising of air bubbles in the liquid causes flow rate, turbulent flow and shearing force to act onto the surface layer of the separation membrane 4, thereby making it possible to wash the separation membrane 4. In other words, the gas-liquid mixture flow generated with air bubbles 10 released from the air diffusing device 7 rises and comes into contact with the separation membrane 4. With this gas-liquid mixture flow, scrubbing is made on each separation membrane 4. Additionally, oxygen dissolving into treated water is carried out by the gas diffusing device 11 for supplying oxygen.

Additionally, treated water is separated into solid content and water under the filtering function of the separation membrane 4. As shown at (b) in FIG. 3, the water collection passage 4b of the separation membrane 4 is in communication with the filtration suction opening 8 through the water collection section 6a, and the suction pump (not shown) is connected through the pining to the other end of the filtration suction opening 8. Accordingly, filtered water filtered through the separation membrane 4 is sucked by the suction pump and transferred to the outside of the membrane separation apparatus 1.

Scrubbing is a method for removing adhered substances on the surface of the separation membrane 4 by swingingly moving treated water on the surface of the separation membrane 4 with water flow containing rising air bubbles 10. Accordingly, as shown in FIG. 1, by stacking the membrane modules 3 one upon another in a direction of depth of treated water, scrubbing can be made onto more separation membranes 4 even with the same amount of air bubbles. In other words, as the number of the membrane modules 3 stacked increases, a scrubbing effect to an air amount to be diffused from the air diffusing device 7 is increased.

Additionally, the distance (the flow passage width) between the water flow guide 5 provided in the membrane module 3 and the separation membrane 4 is smaller in an upper section of the membrane module 3 and larger in a lower section of the membrane module. As a result, in case that the membrane separation apparatus 1 is configured by vertically stacking the membrane modules 3 one upon another, air bubbles 10 generated from the air diffusing device 7 are not diffused to the outside of the membrane separation apparatus 1 thereby making it possible to cause air bubbles 10 to effectively act onto separation membrane 4.

The flow of treated water inside this membrane separation apparatus 1 is a flow directing from the opening section $S_3$ at the lower section of the membrane separation apparatus 1 to the opening section $S_4$ at the upper section. The flow passage of the membrane separation apparatus 1 is simply tightly blocked from treated water existing in the outside, and treated water is filtered by the separation membrane 4, so that the activated sludge concentration of treated water increases as a location in the membrane separation apparatus 1 become higher.

In the membrane separation apparatus 1 of the present invention, treated water existing outside the outer periphery of the member unit 2 is sucked into the membrane separation apparatus 1 through the clearance between the lower end of the water flow guide 5 of the membrane module 3 and the upper end of the water flow guide 5 of another membrane module 3 connected to the lower side of the above-mentioned membrane module 3. Accordingly, an increase in activated sludge concentration inside the membrane separation apparatus 1 can be suppressed.

In other words, since treated water is sucked into the membrane separation apparatus 1 through a space between the respective membrane modules 3 which are stacked one upon another, a large increase in activated sludge concentration inside the membrane separation apparatus 1 can be suppressed. As a result, a load to filtering is lowered thereby resulting in moderating a membrane clogging and reducing an consumed energy. Additionally, since the clearance 9 for sucking treated water existing outside the outer periphery of the membrane separation apparatus 1 into the membrane separation apparatus 1 is formed perpendicular to the flowing direction of treated water flowing in the membrane separation apparatus 1, air bubbles 10 can be prevented from being released from the space between the membrane module 3 and the membrane module 3, thereby making it possible to cause much air bubbles 10 to act on the separation membrane 4. It is to be noted that a sucking force for sucking treated water into the membrane separation apparatus 1 is generated by rising of air bubbles 10, and therefore a power source for sucking treated water is not particularly necessary to be provided.

As discussed above referring to the embodiment, according to the membrane separation apparatus of the present invention, by configuring the membrane unit by stacking the membrane modules one upon another in the height direction, air bubbles generated from the air diffusing device can act on a plurality of the membrane modules. Consequently, the efficiency of scrubbing can be improved thereby making it possible to lower a consumed electric power for a blower for supplying air for scrubbing. In other words, a high filtering flux can be secured while suppressing at the minimum value a wind amount for membrane washing (scrubbing) carried out throughout a filtering process.

Additionally, by providing the water guide to the membrane module, air bubbles can be caused to effectively act on the separation membrane without diffusion of air bubbles generated from the air diffusing device to the outside of the unit. In other words, a scrubbing efficiency can be improved while lowering the consumed electric power of the blower for supplying air for scrubbing.

By stacking the membrane modules one upon another in such a manner that the opening area of the flow passage through which treated water outflows is smaller than the opening area of the flow passage through which treated water inflows, the clearance is formed between the adjacent membrane modules so that treated water can be sucked through this clearance. In other words, each of the stacked membrane modules can suck treated water existing in the outside. Accordingly, an increase in activated sludge concentration can be suppressed while lowering a load to filtering so as to moderate a membrane clogging and lowering a consumed electric power for a filter pump.

Additionally, a washing effect is high if the diameter of air bubbles to be diffused is large, whereas a dissolving efficiency is improved if the diameter of gas bubbles to be used for dissolving gas in treated water is small. Accordingly, by designing the air diffusing device for scrubbing separately from the gas diffusing device for reaction of micro-organisms, the energy consumption amount for a blower or a compressor to be used for the air diffusing devices or the like can be reduced.

It is to be noted that by providing the flow stabilizing member at the lower end section of the separation membrane provided in the membrane module, the inlet of the flow passage of treated water between the separation membranes 4 is formed in such a shape as to spread in a direction toward the lower side by virtue of the flow stabilizing member, so that a sudden decrease in flow passage area between the separation membranes can be moderated. Consequently, the gas-liquid mixture flow is restrained from its sudden contraction in the flow passage between the separation membranes 4, and therefore large air bubbles contained in the gas-liquid mixture flow pass through the space between the separation membranes without being decomposed to small air bubbles. Hence, the gas-liquid mixture flow which is large in diameter of air bubbles can be introduced into between the separation membranes, thereby improving a washing effect to the separation membrane.

EXAMPLES

Discussion will be made on the membrane module, the membrane unit and the membrane separation apparatus according to the embodiment of the present invention with reference to (a) and (b) in FIG. 5. In the example, the same reference numerals are assigned to the same members as those of the membrane module, the membrane unit and the membrane separation apparatus according to the embodiment thereby omitting a detailed explanation thereof. It is to be noted that the water collection block 6c to be located at the front side on the paper surface is omitted to be shown in the figure.

Figure 5:
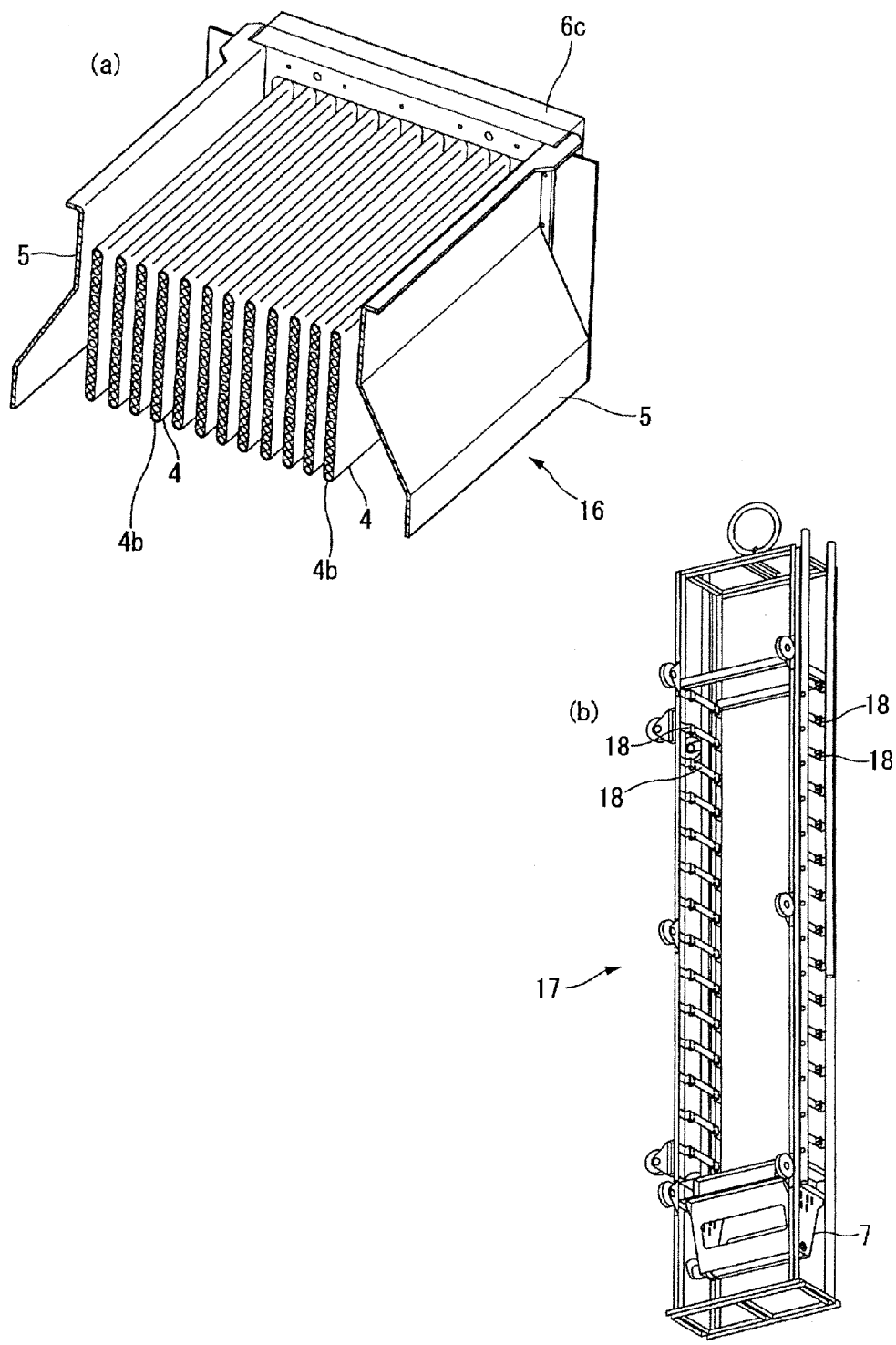
[FIG. 5] in which (a) is a perspective view of a membrane module according to an example of the present invention, and (b) is an exterior view of a frame body to be provided with the membrane module(s) according to the example of the present invention.

As shown at (a) in FIG. 5, in the membrane module 16 according to the example of the present invention, the side end section of the separation membrane 4 formed with the water collection passage 4b is supported by the water collection block 6c. Additionally, the water flow guide 5 is provided to block a space between the side surfaces of the water collection blocks 6c.

The thus configured membrane module 16 is fixed to a frame body 17 as shown at (b) in FIG. 5 thereby configuring the membrane unit and the membrane separation apparatus (not shown).

The frame body 17 is provided at its side surface with a membrane module fixing section 18 for fixing the membrane module 16, and the fame body 17 is provided at its bottom section with the air diffusing device 7.

After the membrane module 16 is fixed to the membrane module fixing section 18, the frame body 17 is dipped in treated water in such a manner that the air diffusing device 7 is located below the membrane module 16. Then, filtering of treated water is carried out by the membrane module 16 while accomplishing air diffusion from the air diffusing device 7.

EXPLANATION OF REFERENCE NUMERALS

1 . . . membrane separation apparatus
2 . . . membrane unit
3, 16 . . . membrane module
4 . . . separation membrane (membrane element)
4a . . . membrane surface
4b . . . water collection passage 5 ... water flow guide
6 ... casing
6a ... water collection section
6b ... separation membrane fixing section
6c ... water collection block
7 ... air diffusing device (for scrubbing)
8 ... filtration suction opening
9 ... clearance
10 ... air bubbles
15 ... flow stabilizing member
$S_1$ ... flow passage (opening area) through which treated water inflows to membrane module
$S_2$ ... flow passage (opening area) through which treated water outflows from membrane module
$S_3$ ... opening section at lower section of membrane separation apparatus
$S_4$ ... opening section at upper section of membrane separation apparatus

The invention claimed is:

1. A membrane module comprising:
a casing including a flow passage through which treated water outflows and a flow passage through which treated water inflows, wherein an opening area of the flow passage through which treated water outflows is smaller than an opening area of the flow passage through which treated water inflows;
a plurality of membrane elements stored inside the casing, each membrane element comprising a flat membrane; and
a water flow guide is disposed in the casing to reduce the opening area of the flow passage through which treated water outflows,
wherein the water flow guide has a stepped shape including a first surface section and a second surface section closer to the opening of the flow passage through which treated water outflows,
wherein the first and second surface sections are substantially parallel to surfaces of the membrane elements, and
wherein the second surface section is closer to the membrane elements than the first surface section.

2. A membrane module as claimed in claim 1, wherein a flow stabilizing member is disposed at a lower end section of a membrane element to introduce treated water into a space between the membrane elements.

3. A membrane module as claimed in claim 1, wherein the water flow guide further comprises a third surface section disposed between the first surface section and the second surface section, the third surface section being angled in a direction of height of the casing with respect to the parallel first and second surface sections.

4. A membrane unit comprising:
a plurality of membrane modules each of which includes a casing formed with opening sections which are respectively opened in upward and downward directions, the membrane modules being stacked one upon another in a direction of height of the casing, each casing including a flow passage through which treated water outflows and a flow passage through which treated water inflows, wherein an opening area of the flow passage through which treated water outflows is smaller than an opening area of the flow passage through which treated water inflows;
a plurality of membrane elements stored inside each casing, each membrane element comprising a flat membrane; and
a water flow guide disposed in each casing to reduce the opening area of the flow passage through which treated water outflows,
wherein the water flow guide has a stepped shape including a first surface section and a second surface section closer to the opening of the flow passage through which treated water outflows,
wherein the first and second surface sections are substantially parallel to surfaces of the membrane elements, and
wherein the second surface section is closer to the membrane elements than the first surface section.

5. A membrane unit as claimed in claim 4, wherein each water flow guide further comprises a third surface section disposed between the first surface section and the second surface section, the third surface section being angled in a direction of height of the casing with respect to the parallel first and second surface sections.

6. A membrane separation apparatus comprising:
a plurality of membrane modules each of which includes a casing formed with opening sections which are respectively opened in upward and downward directions, each casing including a flow passage through which treated water outflows and a flow passage through which treated water inflows, wherein an opening area of the flow passage through which treated water outflows is smaller than an opening area of the flow passage through which treated water inflows;
a plurality of membrane elements stored inside each casing, each membrane element comprising a flat membrane;
an air diffusing device disposed below the membrane modules; and
a water flow guide disposed in each casing to reduce the opening area of the flow passage through which treated water outflows,
wherein the water flow guide has a stepped shape including a first surface section and a second surface section closer to the opening of the flow passage through which treated water outflows,
wherein the first and second surface sections are substantially parallel to surfaces of the membrane elements, and
wherein the second surface section is closer to the membrane elements than the first surface section.

7. A membrane separation apparatus as claimed in claim 6, wherein the membrane modules are stacked one upon another in a direction of height of the casing to configure a membrane unit.

8. A membrane separation apparatus as claimed in claim 6, wherein each water flow guide further comprises a third surface section disposed between the first surface section and the second surface section, the third surface section being angled in a direction of height of the casing with respect to the parallel first and second surface sections.

* * * * *